United States Patent [19]

Simpson

[11] Patent Number: 5,605,102
[45] Date of Patent: Feb. 25, 1997

[54] HAND CART PLATFORM

[76] Inventor: Ronald P. S. Simpson, 8644 NW. 29th Dr., Coral Springs, Fla. 33065

[21] Appl. No.: 588,431

[22] Filed: Jan. 18, 1996

[51] Int. Cl.$^6$ ..................................... B65D 19/00
[52] U.S. Cl. .................. 108/51.1; 108/51.3; 108/56.1
[58] Field of Search ................ 108/51.1, 51.3, 108/56.1, 54.1, 55.1, 55.3, 901, 902, 57.1

[56] References Cited

U.S. PATENT DOCUMENTS

| | | | |
|---|---|---|---|
| 3,636,888 | 1/1972 | Angelbeck, Jr. | 108/55.3 X |
| 3,719,342 | 3/1973 | Kupersmit | 108/55.1 X |
| 4,051,787 | 10/1977 | Nishitani et al. | 108/55.3 |
| 4,226,192 | 10/1980 | Myers | 108/55.3 X |
| 4,694,962 | 9/1987 | Taub | 108/54.1 X |
| 4,843,976 | 7/1989 | Pigott et al. | 108/901 X |
| 4,931,340 | 6/1990 | Baba et al. | 108/51.1 X |
| 5,105,746 | 4/1992 | Reynolds | 108/51.1 X |
| 5,186,338 | 2/1993 | Boutet | 108/53.1 X |
| 5,205,221 | 4/1993 | Melin et al. | 108/901 X |
| 5,267,519 | 12/1993 | Abrahamson et al. | 108/51.1 |

*Primary Examiner*—José V. Chen
*Attorney, Agent, or Firm*—Malin, Haley, DiMaggio & Crosby, PA; Diane Simpson

[57] ABSTRACT

An improved, lightweight, but durable hand truck or hand cart pallet for use in transport and display of merchandise. The pallet may be made of a durable plastic and include a front recessed portion that is sized to receive the support plate of a hand truck. The pallet also includes a rear flange that can engage the front portion of a pallet and allows interlocking of the pallet for a double-pallet display.

10 Claims, 3 Drawing Sheets

HAND CART PLATFORM

BACKGROUND OF THE INVENTION

1. Field of the Invention

This invention relates to a pallet for the transfer of goods, specifically used with a hand truck, which provides a stabilized load platform for the transport of goods and which can also serve as a display case for stacked merchandise. The pallet body includes a lightweight, honeycomb, molded structure, a front bottom recessed opening, sized to receive the support blade on a hand truck and a rear pallet interlock protrusion which allows two pallets to be joined together.

2. Description of the Prior Art

The use of pallets for transport and loading systems is well known in the prior art. Typically, pallets are made of wooden boards joined together as a flat frame that are used to support one or more merchandise cartons and boxes. The frame boards are spaced apart and have a pair of slots for insertion of elongated lifting forks found on motorized or electric fork lift vehicles to lift and move an individual pallet. Manually operated hand carts may also use pallets.

The present invention relates to a hand cart or hand truck pallet that supports and stabilizes a load on a hand cart or truck and is also useful as a display case.

Pallets for transporting and displaying merchandise are known in the prior art. U.S. Pat. No. 4,226,192, issued Oct. 7, 1980 to Meyers, shows a single-piece pallet that includes a plurality of legs that can be operated with a hand truck. Typically, the pallet is made of a unitary body that permits stacking of cases of merchandise without interference to view the writing on the merchandise displayed in the pallets. U.S. Pat. No. 4,368,675, issued Jan. 18, 1983 to Propst, shows a material handling pallet that has stackable shelves for stacking pallets. U.S. Pat. No. 4,567,981, issued Feb. 4, 1986 to Headon, shows a display packaging system that includes shelves for both displaying and transporting goods.

The present invention provides a compact, lightweight pallet suitable for use with a hand truck that can stabilize a load and also be used as a display platform. The pallet includes a special recessed bottom opening for mounting on the hand cart safely and quickly and has a rear flange for allowing adjacent pallets to be interlocked together. The interlock would be for multiple shelving arrays. The present invention can be easily fabricated from ABS plastic or an equivalent molded to a honeycomb infrastructure.

SUMMARY OF THE INVENTION

A hand cart pallet comprising a rigid, substantially rectangular, upper planar surface and first, second, and third vertical walls rigidly integrally attached to said upper rigid planar surface, a second bottom horizontal planar surface attached to said three vertical side walls, said second planar surface having a large recessed portion facing the front. The bottom or base surface is rigidly attached to the side walls.

The recessed opening in the base rigid surface allows for the receipt of a hand truck blade or plate that is used to support the pallet on the hand truck so that the hand truck support plate can be inserted along the base of the pallet due to the recessed opening in the bottom surface.

The pallet, on the opposite side from the front opening formed by the recessed base surface includes a protruding flange, which itself is sized to fit into the recess of an adjacent pallet from a front-to-back regimentation.

The top view of the pallet shows a substantially flat, planar surface that can receive cartons or individual canned goods or other types of products that are to be transported by a hand truck and/or displayed. The pallet itself may be approximately 2 ft. wide and 1.5 ft. deep and approximately 3 in. high.

When viewed from the front in elevation, the pallet has a bottom recessed opening approximately 18 in. across the front and approximately ¾ in. high. The opening is sized to receive a conventional hand truck or hand cart support plate.

The pallet vertical side walls are rigid, formed plastic on three sides, forming rectangular enclosure, joining the top stacking, rigid, planar surface and the bottom base that includes the hand cart support lift opening. The side walls, which are joined around three sides forming a U-shape, are approximately 1.5 in. tall.

Along the back wall, there is approximately ¼ in. protrusion or extending horizontal flange, which allows the device to be engaged in a front-to-back relationship with an adjacent pallet for display purposes. This would allow a multiple pallet display with merchandise from front to back, while joining the pallets together. The parallel side walls and the back wall are closed around the three sides of the pallet.

The pallet may be made cost effectively of a durable, but lightweight, plastic material, making it easy to haul goods with the hand cart, structurally rigid for supporting cartons of materials, and small enough so that it can be conveniently stacked when not in use, or stacked and used for displaying merchandise in a store.

The back wall of the pallet may contain a chamfer around three sides of the device, while the back wall has the extending lip which allows it to be joined to an adjacent pallet.

It is an object of this invention to provide an improved hand cart pallet that is lightweight, durable, and can stabilize a load for a hand pallet that enables more product to be stacked wider as well as higher than without using the hand cart pallet, thus improving efficiency of moving product.

It is another object of this invention to provide a lightweight, easily manufactured, hand truck pallet that also can become a display platform for displaying merchandise.

And yet another object of this invention is to provide a hand truck or hand cart pallet that includes a plate opening in the front of the pallet, making it easy access for the hand truck, saving time and energy and reducing injuries to the users.

And yet still another object of this invention is to provide a hand truck or hand plate pallet that functions as both a pallet and a display stand and is made of a lightweight plastic for durability and aesthetic views.

In accordance with these and other objects which will become apparent hereinafter, the instant invention will now be described with particular reference to the accompanying drawings.

DESCRIPTION OF THE PREFERRED EMBODIMENTS

Figure 1:
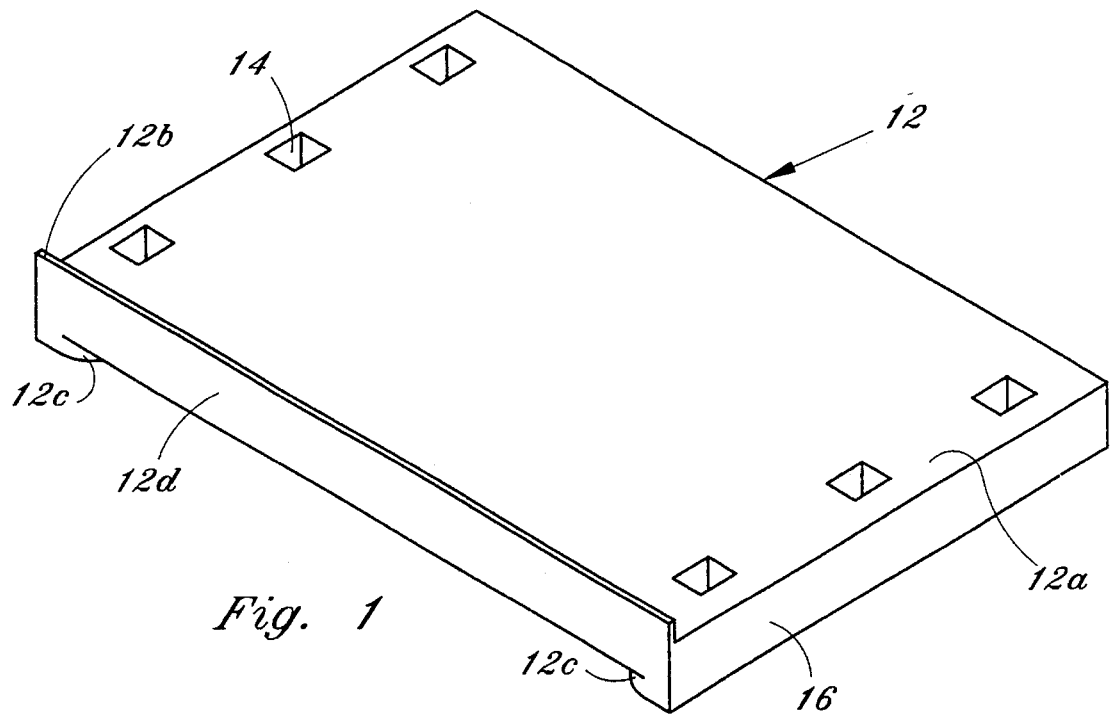
FIG. 1 shows a perspective view of the present invention.

Referring now to the drawings and in particular to FIG. 1, a perspective view of the pallet 10 is shown in accordance with the present invention. The invention includes the top support platform 12a which is a flat, planar, rigid, substantially rectangular surface occupying the top surface of the pallet body 12. The top surface platform 12a is used to support goods, boxes, or articles that are transported by a hand cart. As shown in FIG. 1, the pallet 10 can also be used for displaying merchandise after transport with the hand cart. Boxes of canned goods, for example, can be readily displayed while disposed on top of the pallet. The upper surface 12a of the pallet body 12 could include a series of grooves for an anti-slip pattern intricately formed on the upper planar surface.

The pallet body 12 also includes a vertical lip approximately ⅛ in. in height running along a front lip 12b, running along one front edge which would also prevent slippage of items when they are transferred on and off of the pallet when using the hand truck.

The pallet 10 includes along the front base a recessed opening defined between curved segments 12c that is sized to permit the entrance of the hand truck support plate. Thus, there is sufficient space from the floor due to the raised intersection defined by curved edges 12c for easily manipulating the hand truck support plate underneath to engage the pallet.

The pallet may in an alternate embodiment include a plurality of sockets 14 which allow for attachment of a partial or complete vertical wall that can be used for display purposes and is described below. Side 16 of the pallet body 12a is intricately formed with the pallet.

Figure 2:
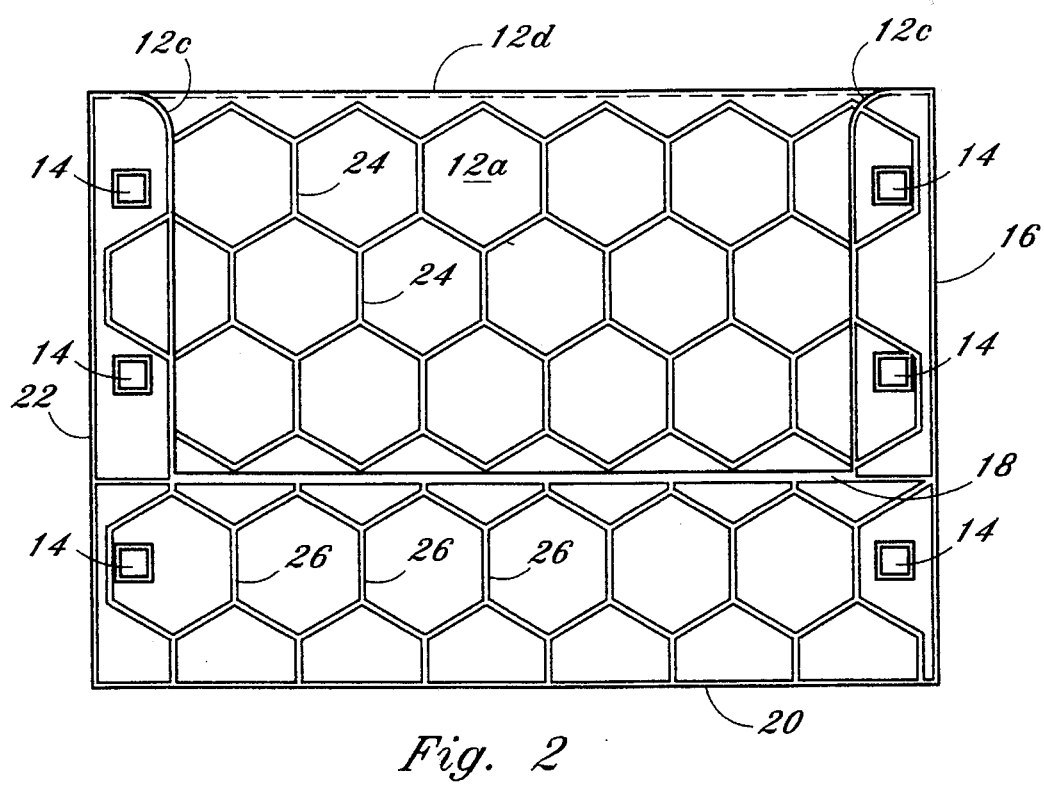
FIG. 2 shows a bottom plan view of the present invention.

Referring now to FIG. 2, the bottom view of the pallet is shown that includes an integral honeycomb wall structure 24 and 26 of different heights that form a large, rectangular, recessed opening 12c facing the front of the pallet body 12 along the front surface, but not completely across the front surface of the pallet. The recessed opening 12c formed by the honeycomb walls 24 is flat, substantially hexagons, which are unitarily joined to longer honeycomb walls 26 which are connected to three side walls 18, 20 and 22. The forward edges 12c defining the recessed portion may be curved, which allows unobstructed access of the hand truck support plate, protruding from the base of the hand truck to fit quickly into the recessed opening formed in the front edges 12c of the pallet. The purpose of the recessed opening in the base of the pallet is to allow easy access of the hand cart support plate for lifting the hand cart pallet with goods for transport with the hand cart.

A hand cart and a hand truck are essentially mobile, manually actuated transport devices having two wheels, a rigid plate, perpendicular to an upper frame with handles, so that a person can manipulate the handles for moving the hand cart or hand truck, with goods supported on a pallet mounted on the support plate.

Figure 3:
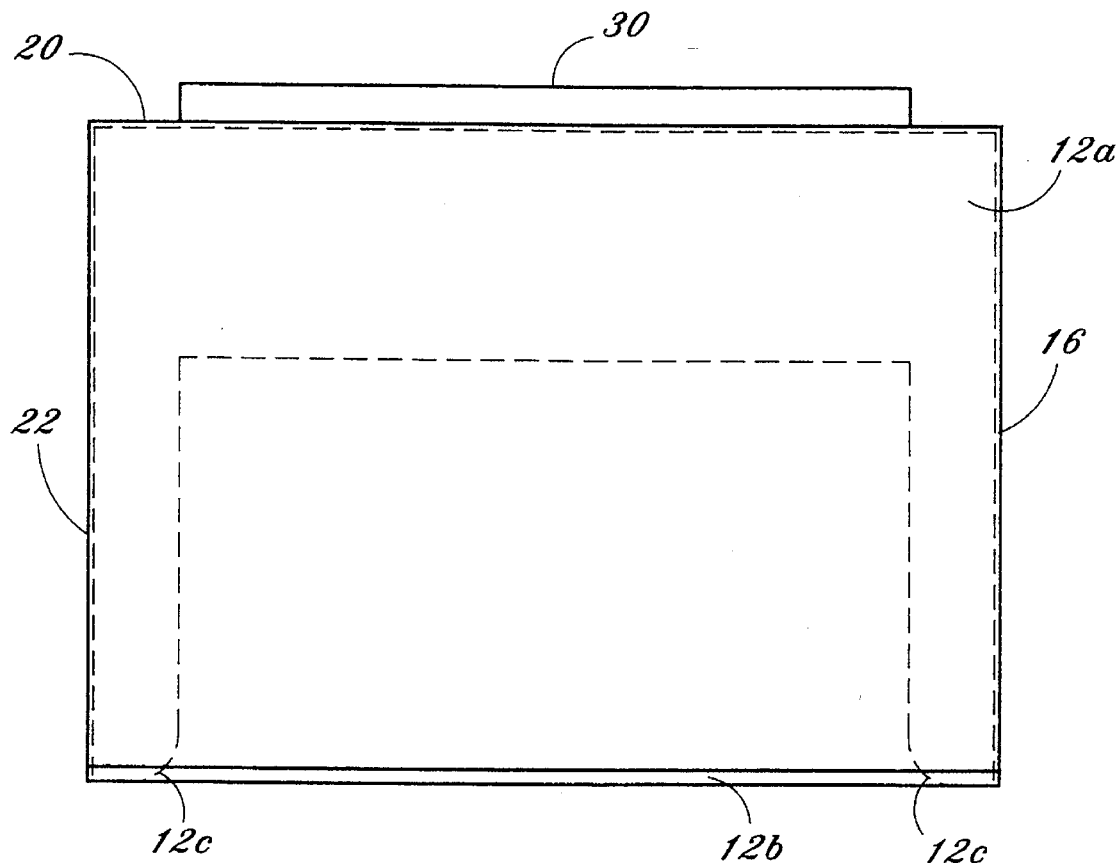
FIG. 3 shows a top plan view of the present invention.

FIG. 3 shows a top view of the pallet in accordance with the present invention with the bottom surface being shown dotted to show the overall recess configuration. Based on the top view, it is shown that there is a flat, rigid surface that can readily support merchandise, such as canned goods or other objects on the top, rigid surface.

Figure 4:
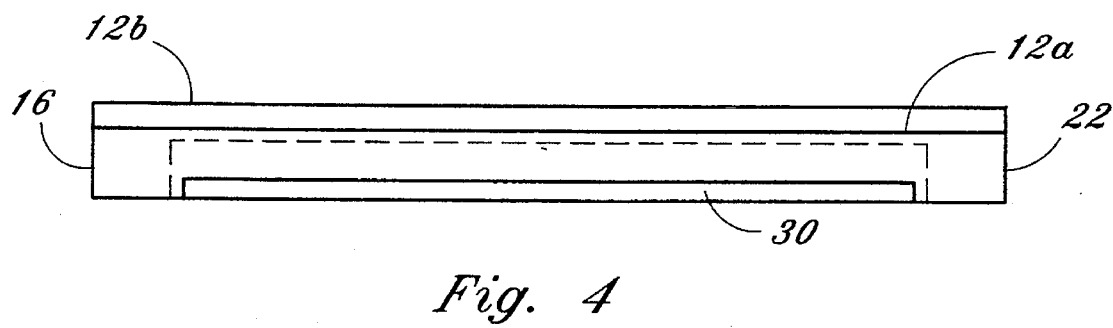
FIG. 4 a front elevational view of the present invention.

FIG. 4 shows a front view of the pallet 10 and clearly shows the recessed opening 12c disposed across the central portion of the front face of the pallet for receiving the hand cart support plate.

Figure 5:
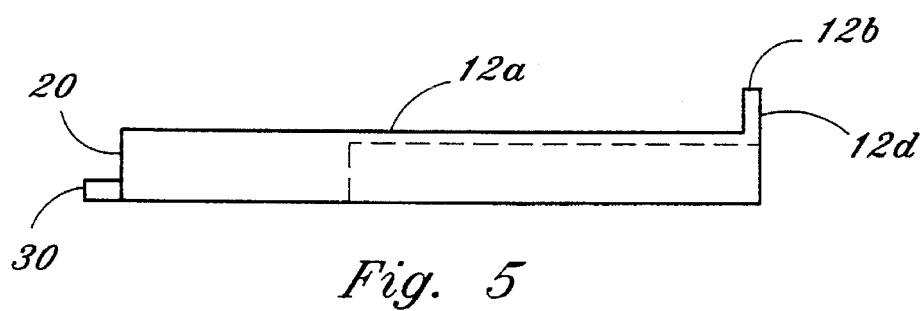
FIG. 5 shows a cut away portion of a side view of the rear surface wall of the present invention.

FIG. 5 shows a cut away view in side elevation of the back wall that readily shows a protruding tongue from the base of the pallet that extends beyond the back wall of the pallet. The protruding tongue is sized to fit within the front recessed opening, which allows two pallets to be locked in place from front to back, which would be suitable for a display stand.

The pallet body may be made of metal or plastic to make it lightweight, durable, and attractive for use when used in display.

Figures 6, 7:
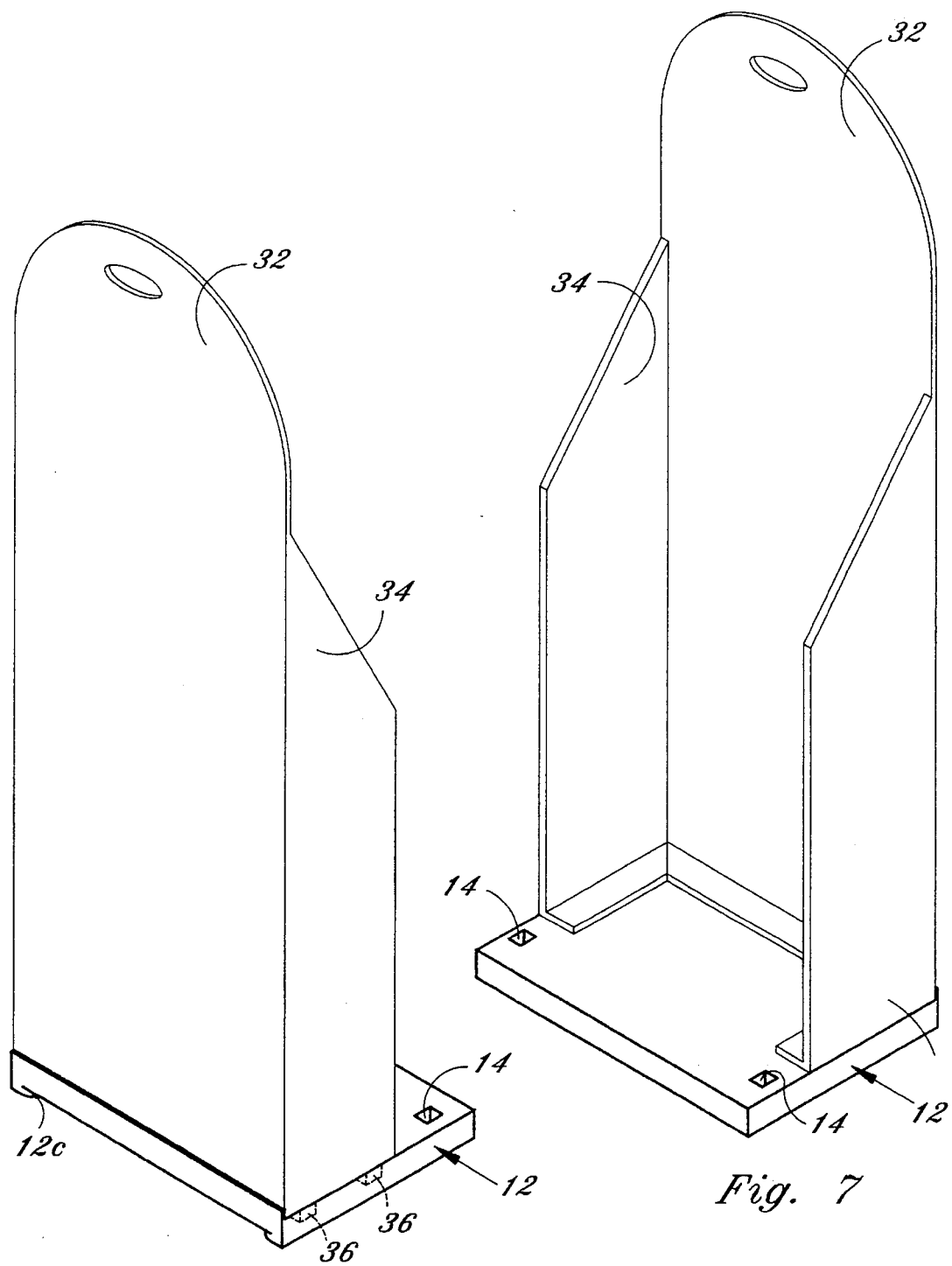
FIG. 6 shows a rear perspective view of an alternate embodiment of the present invention that includes a vertical display wall.
FIG. 7 shows a front perspective view of the alternate embodiment shown in FIG. 6.

FIG. 6 shows the improved pallet with a vertical retaining wall that fits with pegs snugly into the recesses 14. The purpose of the retaining wall is to allow the pallet to be used as a display for supporting cans or other objects in a confined area. The retaining wall could completely form three perpendicular walls of the device either full length or partial length as shown in FIG. 6. The retaining wall is removable and disengageable from the pallet as shown by virtue of pulling it away from the socket mounted on the top of the pallet.

By having the forward recessed portion between the floor and the upper edge of the pallet along the front defined between curved edges 12c, the blade or support plate of the hand truck will not have to scrape the floor in order to get under a product package. Without the pallet, if cartons were mounted by themselves, typically the blade of the hand truck has to scrape tile floors, marring the surface of the floors in order to move cartons of goods. This scraping of the floors is eliminated by use of the pallet shown in the present invention.

The honeycomb body shown in FIG. 2 provides for lightweight and at the same time strength and rigidity. Referring out of FIG. 2 a backplate support wall 18 traverses the end portion of the recess defined by edges 12c so that the blade of the hand cart or hand truck engages a more rigid portion 18 defined along the inside of the pallet body 12. The rigid bar 18 is integrally formed and the entire molded device is there to provide extra support along the back edge of the blade. However, the use of the hexagon walls which are also molded and joined integrally with top surface 12a and sidewalls 16, 20 and 22 provide for lightweight yet sturdy structure. Each honeycomb element 24 or 26 can be of a predetermined size noting that honeycomb walls 24 are shorter in height than honeycomb walls 26 which act to form the recessed opening 12c by virtue of the shorter length or height of honeycomb walls 24. The peg or holes 14 can proceed through the device or could be just recessed. They receive the product retaining wall described in FIG. 6.

FIG. 6 shows an alternate embodiment of the invention which includes the pallet 12 having substantially vertical walls 32 and 34, which may be unitarily formed and are disposed substantially perpendicular to each other, affixed by pegs 36 into the sockets 14 shown in the pallet, which would firmly hold the vertical walls 32 and 34 in place on top of pallet 12. The retaining wall 32 and the side walls 34, which could extend all the way to the front or full depth of the pallet 12, are used for display purposes, wherein merchandise, such as canned goods, stacked on top of pallet 12 could be held in place by the vertical walls 32 and 34 so that the pallet serves not only to transport the goods, but once it arrives at the desired location at the point-of-sale distribution in a store, the side walls can be used to help keep the goods properly stacked. The vertical retaining wall 32 can be unitarily formed with the side walls 34 so that it is a plastic, thin-walled unit that has rigidity and also formed with the rectangular pegs 36 so that it is readily detachable from the pallet 12 when desired.

In use, the pallet would be utilized with the merchandise, such as a carton of canned goods, which is placed on top of the pallet. The hand cart support plate is then positioned and slid underneath the pallet in the recessed opening of the pallet, where it is readily balanced and quickly and efficiently received on the pallet. The hand truck or hand pallet can then be moved to a desired location where the pallet is rested again on the floor and the hand truck moved away from the pallet. In this position, the pallet can then be used for displaying merchandise that is contained thereon. A second pallet can be placed adjacent to the first pallet and locked in place for a double display from front to back of the merchandise.

Each pallet can be stacked on top of other pallets and readily stored out of the way, since each pallet is approximately 3 inches in vertical height.

The pallet is made of a rigid plastic in the preferred embodiment and can be lightweight, yet very durable and strong for lifting materials. Thus, the pallet is capable of being used for hand cart transport of articles, display of merchandise stacked thereon, or capable of out-of-the-way storage in a stacked fashion.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A hand cart platform for transport and display of merchandise, comprising:

a rigid support platform having a top planar surface and sized for use with a hand cart, said support platform having a periphery defined by a front portion, a rear portion, and opposing side portions;

a front vertical wall, a rear vertical wall, and a pair of opposing side vertical walls, each of said vertical walls extending downwardly from the periphery of said top planar surface;

said front vertical wall defining a recessed opening extending at least partially thereacross and sized to receive a hand cart support plate; and said recessed opening further defined by a bottom structure disposed beneath, and attached to, said rigid support platform, said bottom structure includes a first portion having a wall structure of a first height, and a second portion having a wall structure of a second, different height than said first portion, said second portion wall structure positioned around said first portion wall structure, thereby defining an opening forming a recess beneath said support platform, and sized to receive the support plate of said hand cart therein.

2. A pallet as in claim 1, wherein said pallet is made of a durable plastic.

3. A hand cart platform as in claim 1, further including:

a horizontal tongue perpendicularly protruding from said rear vertical wall for interlocking said platform to an adjacent platform.

4. A hand cart platform as in claim 1, further including:

an elongated retaining wall and a pair of retaining side walls perpendicularly attached to said elongated retaining wall thereby forming a U-shaped structure;

a plurality of pegs unitarily formed at the base of said retaining walls;

said platform top planar surface having a plurality of recessed sockets sized to receive said pegs.

5. A hand cart platform as in claim 1, wherein said top planar surface, said plurality of vertical walls, said front vertical wall, and said bottom structure, are integrally molded together in a single unit.

6. A hand cart platform according to claim 1, wherein said front vertical wall includes a projecting lip extending vertically above said top planar surface.

7. A hand cart platform according to claim 1, wherein said front vertical wall opening is defined between a pair of curved front vertical wall segments.

8. A hand cart platform according to claim 1, wherein said bottom structure comprises a geometric pattern.

9. A hand cart platform according to claim 1, wherein said geometric pattern is a honeycomb.

10. A hand cart platform for transport and display of merchandise, comprising:

a substantially rectangular, rigid, support platform having a continuous top planar surface and sized for use with a hand cart, said platform having a front end, a rear end, and opposing sides;

said platform further having a plurality of vertical walls extending downwardly from said top planar surface at said front end, said rear end, and each of said opposing sides;

said front end wall defining a recessed opening extending partially across said front end wall and sized to receive a hand cart support plate;

said rear end wall having a horizontal protruding tongue extending therefrom; and a vertical lip proximate said front end.

* * * * *